Feb. 2, 1954 P. H. GENTZEL 2,667,892
PILOT CONTROLLED MAIN VALVE FOR FLUID PRESSURE SYSTEMS
Original Filed Nov. 4, 1941 6 Sheets-Sheet 1

INVENTOR
PERRY H. GENTZEL
BY
Caesar and Rivise
ATTORNEYS

Feb. 2, 1954   P. H. GENTZEL   2,667,892
PILOT CONTROLLED MAIN VALVE FOR FLUID PRESSURE SYSTEMS
Original Filed Nov. 4, 1941   6 Sheets-Sheet 5

INVENTOR
PERRY H. GENTZEL
BY
Caesar and Rivise
ATTORNEYS

Patented Feb. 2, 1954

2,667,892

UNITED STATES PATENT OFFICE 2,667,892

PILOT CONTROLLED MAIN VALVE FOR FLUID PRESSURE SYSTEMS

Perry H. Gentzel, State College, Pa.

Continuation of application Serial No. 417,775, November 4, 1941. This appplication September 14, 1946, Serial No. 697,053

1 Claim. (Cl. 137—473)

This invention relates to fluid pressure systems utilizing safety valves to relieve excess pressure, and has as its primary object the provision of safety valves for a fluid pressure system of very simple and inexpensive construction capable of more economical and efficient operation than previously considered possible, and wherein excess pressure may be relieved instantaneously either automatically or manually from a convenient location.

Another object is to provide a pilot valve particularly suitable for use in such a fluid pressure system.

Another object is to provide a pilot-actuated valve particularly suitable for use in such a system.

Other objects and advantages will appear as the description of the invention proceeds.

Referring briefly to the drawings.

Referring in greater detail to the safety valve shown in Figures 1 to 5 inclusive, the numeral 1 denotes the valve body or bowl of the valve. This element, which is shown as being in the form of a pear-shaped hollow casting or forging, may advantageously be of steel, though other metals or alloys may be used. The top of the body is open and is provided with a flat annular seat 2, which serves a purpose to be hereinafter pointed out.

Figures 1, 2, 3, 4, 7:
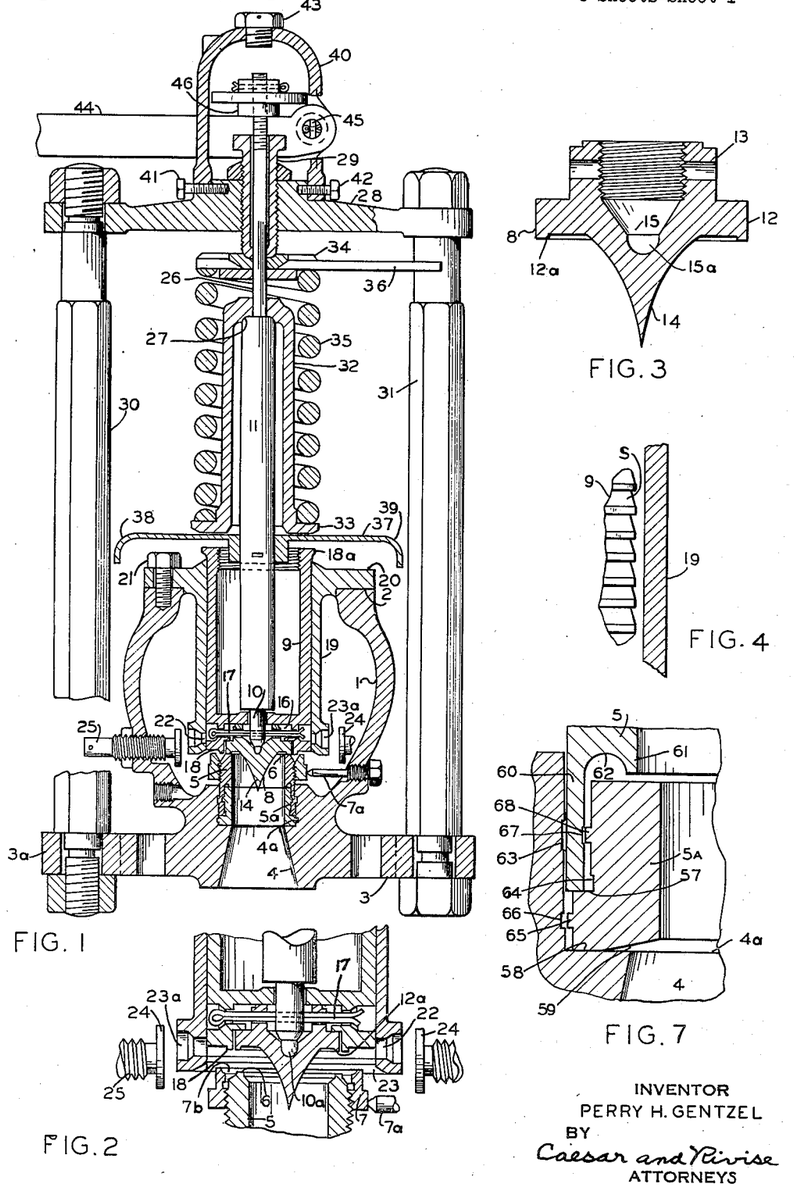
Figure 1 is a vertical section, partly in elevation and partly broken away, of an illustrative form of safety valve constituting part of a fluid pressure system.
Figure 2 is a fragmentary section of the valve disk and adjacent parts of the valve shown in Figure 1, the parts being shown in the relative positions they occupy when the valve is in substantially full open position and ready to cut off and close.
Figure 3 is a vertical section through the valve disk itself.
Figure 4 is an enlarged fragmentary section through the valve disk carrier or piston and cylindrical guide to illustrate the serrated outer periphery of the valve disk carrier or piston.
Figure 7 is an enlarged fragmentary horizontal cross-section showing the manner in which the throat tube is assembled and secured to the body of the valve.

The body is provided at its lower end with the horizontal flange 3 and the lugs 3a. The reference numeral 4 denotes a relief opening for connection with a steam boiler or a tank adapted to contain fluid under pressure. The relief opening 4 tapers upwardly into the body of the valve, and has a stepped upper portion providing an annular recess 4a. Within this annular recess are secured the throat tube nozzle 5 and the nozzle expansion ring 5a in a manner to be later described.

The throat tube is preferably stream-lined at its upper end, and is provided with an annular valve seat 6. It may advantageously be provided with a nozzle ring 7 mounted concentrically with the valve seat. The ring 7 is preferably mounted adjustably on the upper end of the throat tube as by means of cooperating screw threads on both the tube and the ring. The locking screw 7a may be provided to maintain the ring in adjusted position. The shape of the ring does not constitute an essential feature of the invention, but it should preferably be such as to secure a minimum "blowdown" and to eliminate what is technically known as "warn" or "simmer" at popping.

It is to be particularly noted that between the valve seat 6 and the upper periphery of the nozzle ring 7 there is formed a V-shaped annular groove 7b. This groove, which is normally covered by the valve disk and disk carrier, constitutes in effect a pilot valve, the least amount of steam leaking into this space from the throat tube being sufficient to cause the valve to pop without any accumulation of pressure. As will be hereinafter pointed out, the upper portion of the groove may be restricted when the valve disk is on its seat by means of an annular ridge provided on the underside of the piston or disk carrier (see Figure 2) or by means of an overhanging portion on the valve disk (see Figure 5).

The valve disk (see Figure 3) is designated generally by the numeral 8. It is detachably connected to the disk carrier or piston 9 and to the lower reduced end 10 of the spindle 11 in a manner to be described. It is to be particularly noted that the piston 9 preferably projects through the valve body to the atmosphere. In this way, I have found it possible to obviate the accumulation of steam above the valve disk which usually occurs in conventional constructions. The valve disk consists of a disk-like body portion 12, which is wide enough to cover the valve seat 6 and to close the passage through the bowl. The underside of the body portion 12 is preferably provided with an annular rim 12a, which may advantageously be the same width as the valve seat 6. This rim serves to prevent the formation of fins on the valve seat. The formation of fins is a principal cause of leakage.

In the valve disk of Figures 1, 2 and 3 the annular rim 12a is shown as being disposed at the outer edge of the underside of the valve disk. The annular rim may be spaced a short distance from the outer edge, as in the embodiment of the invention illustrated in Figures 5 and 6.

The valve disk 8 is preferably provided with a lower conical portion 14, which cooperates with the upper end of the throat tube 5 to minimize the resistance to the flow of steam from the throat tube. By stream lining the portions of the valve with which the steam comes into direct contact, I have found it possible to obtain a nozzle efficiency of 94 to 97%. This high efficiency renders it possible to obtain full opening of the valve instantaneously, and without any appreciable accumulation of pressure (overpressure). This is particularly so in valve constructions wherein the piston or disk carrier 9 is provided on its underside with the annular ridge previously referred to.

The valve disk is further provided with a central recess 15, which extends well into the body portion. The lower end 15a of the recess is hemispherical in shape and extends well below the valve seat level 12a. The body of the valve disk is symmetrical in design and preferably has the same wall thickness as the throat tube. The valve disk has a minimum amount of metallic contact with the disk carrier 9 and the spindle 11. It is to be particularly noted that the reduced end 10 of the spindle has a narrow rounded point 10a which is received in the hemispherical recess 15a in the valve disk 8. The foregoing structure is such that the heat transfer between the various elements is kept at a minimum and the radial expansion of the valve disk is substantially the same as that of the valve seat 6. As a result, the tearing action between the valve disk and the seat so characteristic of prior art valves is practically eliminated. Furthermore, there is no tendency for the valve disk to either tilt on its seat or to become distorted. Hence, the valve disk must either pop or lie substantially flat on its seat.

The disk carrier or piston 9 is in the form of a cylindrical cup having the cylindrical recess 16 in its bottom. The valve disk 8 is received within the recess 16 with its conical lower portion 14 extending down into the throat tube nozzle 5. The depth of the recess is preferably such that the body 8 projects slightly below the bottom of the disk carrier. The restricted lower end 10 of the spindle 11 extends through an aperture in the bottom of the carrier 9 into the recess 15 of the valve disk. A cotter pin 17, which may well be of stainless steel, extends through alined apertures in the disk carrier 9, the restricted upper portion 13 of the valve disk and the restricted lower end of the spindle 11 to detachably secure the valve disk to the disk carrier and to the spindle. The rounded pointed lower end 10a of the spindle fits snugly in the hemispherical bottom 15a of the recess 15 of the valve disk.

The disk carrier or piston 9 is shown as being provided about the recess 16 with an annular ridge 18 which overhangs the annular groove 7b between the throat tube 5 and the nozzle ring 7. The ridge 18 restricts the wide portion of the groove 7b when the valve disk is on its seat, and appears to have the effect of increasing the sensitivity of the valve, resulting in instantaneous full lift of the valve disk, particularly in small valves up to 1½". As will hereinafter be pointed out, the groove 7b may be restricted by means of an overhanging portion on the valve disk (see Figure 5).

The disk carrier or piston 9 is mounted for slidable movement in the guide 19. The guide is substantially cylindrical in form and is provided at its upper end with an annular flange 20, which is adapted to seat on the annular seat 2 on the bowl 1. The flange 20 may be secured to the seat in any suitable manner, as by means of the threaded bolt 21. In case the valve seat has to be remachined, the guide member may be lowered the necessary amount to cause a reseating of the valve disk by machining the annular seat 2 the required amount.

The outer surface of the disk carrier or piston 9 or the inner surface of the guide 19 may be serrated to form a labyrinth type of packing between these two elements. In Figure 4 the serrations are shown provided on the outer surface of the disk carrier and are indicated by the reference character S. The angle of the serrations to the vertical is such as to secure the maximum possible expansion of the pressure carried in the "exhaust belt" of the guide to be hereinafter described, and depends to a large extent upon the pressure and temperature of the steam or other gas under the valve. For pressures of from 200 to 400 pounds, I have found an angle of from 2° to 6° to be suitable to give the best possible type of labyrinth packing. By permitting the escape of a small amount of steam to the atmosphere around the periphery of the disk carrier 9, metallic contact between the disk carrier and the guide 19 is reduced to a minimum during the entire time that the disk is away from the seat. After each pop, the disk carrier is perfectly free on the spindle and may be rotated its full tolerance.

The upper peripheral margin of the disk carrier 9 is shown as being flared at 18a at about an angle of 45°. This serves to deflect the steam escaping between the piston 9 and guide 19 away from the spring to be hereinafter described, thereby protecting the spring from direct contact with the escaping steam. As will hereinafter be pointed out, a deflector plate may be mounted on the spindle between the disk carrier and the spring to protect the spring as well as the frame rods to be hereinafter described, in which case it will be unnecessary to provide the upper peripheral margin of the disk carrier with the flare 18a.

The numeral 22 designates an annular recess formed in the inner surface of the cylindrical guide 19 near its lower end. This recess will hereinafter be referred to as the "exhaust belt" or "exhaust chamber" for a reason which will appear as the description proceeds. The upper and lower walls of the exhaust belt are preferably disposed at right angles to the vertical circumferential wall. The underside of the lower wall may advantageously be bevelled at an obtuse angle, as indicated by the reference numeral 23.

The outer circumferential wall of the exhaust belt is provided with one or more apertures 23a, which may advantageously be disposed radially at equal distances about the exhaust belt. These apertures will hereinafter be referred to as "exhaust ports." Opposite one or more of the exhaust ports is a valve disk 24 disposed at right angles to the corresponding port and carried at the inner end of a threaded rod 25, which extends through the wall of the bowl. In a preferred embodiment, there are four exhaust ports equally spaced about the exhaust belt, two of the exhaust ports being provided with valve disks 24 and the other two exhaust ports being uncontrolled. The valve disks 24 will be hereinafter referred to as "metering valves."

At this point, it is to be noted that the exhaust belt is above the valve seat and that it is normally closed about its inner periphery by the lower periphery of the piston 9. As soon as the valve disk recedes from its seat, the exhaust belt opens into communication with the throat tube, and permits a sufficient amount of steam under pressure to escape from under the valve disk, thus preventing a building up of pressure under the disk. The area of the exhaust belt is large enough to compensate for the jet action and reactive force, but it is not as large as the area of the throat tube. The exhaust belt provides means for eliminating the undesirable effects of jet action and reactive force, thereby rendering it possible to achieve instantaneous full opening without sacrificing minimum blow-down.

It is also to be noted that the metering valves constitute means to regulate or control the amount of steam escaping through the exhaust belt. The metering valves provide for fairly accurate control or regulation of any reaction pressure to which the valve disk may be subjected, and permit a fairly wide range of blow-down. To increase the blow-down, it is merely necessary to screw the threaded rod 25 in toward the exhaust ports, while to decrease the blow-down, the rods are screwed outwardly. I have found it possible to vary the blow-down from above 8% to as low as ½ of 1%.

It is further to be noted that the adjustment of the metering valves is unaffected by the rise and fall of the exhaust belt due to body extension, as the exhaust belt is always within the active field of operation of the nozzle ring 7. Furthermore, no rearrangement or changing of the parts is necessary when the guide 19 is lowered to reseat it after the valve seat is remachined as has already been described.

Referring now to the spindle 11, it will be noted that in addition to its reduced lower end 10 it has an upper reduced end 26, which forms a shoulder 27 with the central body portion of the spindle. The end 26 extends through a yoke or cross-bar 28, and is threaded as shown for a purpose to be hereinafter pointed out. The numeral 29 designates a pressure or adjusting screw, which serves as a bushing or guide for the upper end of the spindle in addition to its function of adjusting the pressure on the spring. The cross-bar 28 is supported above the valve by means of the two frame rods 30 and 31, which may be threadedly engaged at their lower end with the lugs 3a. These frame rods serve to overcome in large measure the effect of crawl or body elongation by maintaining the pressure of the spring practically constant.

The numeral 32 designates a sleeve, which is mounted on and suspended from the shoulder 27. For most of its length the inner diameter of the sleeve is greater than that of the spindle 11. The sleeve is provided at its lower end with a flange 33, which is spaced a small distance above the top of the disk carrier or piston 9. The numeral 34 indicates a collar or spring washer to which is connected in any suitable manner the coil spring 35, the other end of which spring is supported upon the flange 33 of the sleeve. The spring is shown as being exposed, but it may be enclosed, particularly if the valve is to be used in still work. Pressure is adapted to be applied to the spring through the collar or spring washer 34 by means of the pressure screw 29, which bears directly against the collar or spring washer. The guide rod 36 serves to prevent rotation of the spring washer 34 and the spindle 11 with rotation of the screw 29. Rotation between the spring and the spindle generally occurs in conventional valves when the pressure screw 29 is rotated to set the valve to the required popping pressure and also at the moment the valve pops. Rotation between these elements tends to destroy the lapped seating surfaces and is therefore undesirable.

It is to be noted that the top of the sleeve 32 is the lower limit of movement of the spring washer or collar 34; also that the distance between the lower surface of the washer or collar 34 and the upper margin of the sleeve 32 is equal to the lift that will give full capacity of the nozzle or orifice of the valve. Hence, it is impossible to strain the spring by an overload, for when the spring reaches its capacity or required compression for full lift the washer or collar 34 and the sleeve 32 contact. It is also to be noted that the mounting of the spring also eliminates side thrust and friction between the parts, and that there is a minimum of metallic contact between the spring mounting and the rest of the valve. As will hereinafter be pointed out in greater detail, the spring is protected from direct contact with the steam and from great and sudden temperature changes by means of the deflector plate 37 now to be described.

The deflector plate 37 is secured in a suitable manner to the spindle 11 between the valve body 1 of the valve and the sleeve 32. The deflector plate may be rectangular in form and may be provided with the downwardly extending flanges 38 and 39 at the two edges adjacent the frame rods 30 and 31. The deflector plate serves to deflect any steam or vapor that might otherwise reach the frame rods 30 and 31 and the spring 35, thereby protecting said elements from great and sudden temperature changes. Heat cannot reach the frame rods and spring directly. For instance, heat of conduction to reach the spring 35 has to pass up the spindle 11 to the point of suspension of the sleeve 32 and then down again to the flange 33 of the sleeve. In this connection, it may be stated that the quantity of heat transmission to the frame rods and the spring can be further decreased by insulating the frame rods from the valve body and insulating the deflector plate from the spindle 11. A suitable manner of insulating the frame rods consists in encasing them in insulation material, it being preferable to maintain complete circulation around the frame rods. It is generally not necessary to extend the insulation material above the deflector plate.

The numeral 40 designates a cap or bonnet of suitable form or construction, which may be secured by means of set screws 41 and 42 to the yoke or cross-bar 28. The bonnet may be provided at its top with a threaded aperture adapted to interchangeably receive a plug 43 or a gag screw (not shown).

The numeral 44 refers to a lever which is fulcrumed at 45 in the bonnet. The lever engages the lower surface of a nut 46, which is threadedly connected to the upper reduced end 26 of the spindle 11, and extends through an aperture provided in the side of the bonnet. The lever provides a means for raising the valve disk from its seat by hand or by means of a cable (not shown).

Figure 5:
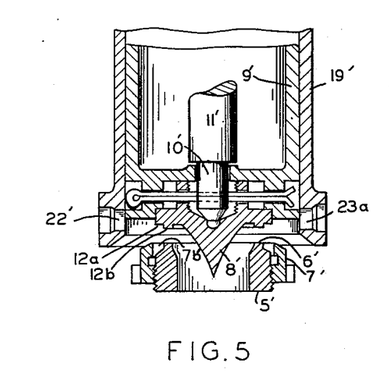
Figure 5 is a fragmentary section similar to Figure 2 of a somewhat modified form of safety valve.
Figure 6:
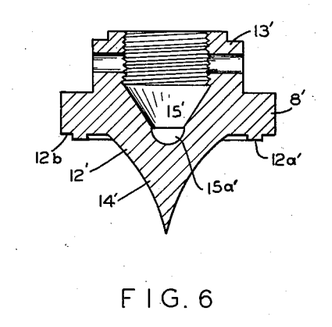
Figure 6 is a vertical section through the valve disk of Figure 5.

The embodiment of the invention illustrated in Figures 5 and 6 differs from that shown in Figures 1, 2 and 3 in several important particulars. In Figures 5 and 6 the parts are designated by the same numerals as in Figures 1, 2 and 3, a prime being added. It will be noted that the valve disk 8' is somewhat wider than the valve disk 6' and that the annular rim 12a' on the undersurface of the valve disk is spaced inwardly from the outer edge of the valve body, so that the annular recessed edge portion 12b beyond the rim 12a' overhangs the annular groove. It will also be noted that the recessed portion 12b is somewhat below the lower surface of the piston or disk carrier 9', so that the recessed portion 12b overhangs the groove 7b' and serves to restrict its wide portion. This restriction, as previously stated, has the effect of increasing the sensitivity of the valve.

At this point, it is to be noted that the nozzle ring 7 in Figures 1 and 2 or the nozzle ring 7' in Figure 5 may be adjusted so that its upper rim portion is either flush with the valve seat, or above or below the valve seat a desired amount.

Reference will now be had to Figure 7, which is an enlarged fragmentary vertical cross-section through the upper end of the relief opening 4, the throat tube nozzle 5 and the nozzle expansion ring 5a, showing the manner in which these elements are assembled prior to the operation of expanding and rolling the throat tube nozzle and the expansion ring into the recess 4a at the upper end of the relief opening.

As shown in Figure 7, the expansion ring 5a is wider at the bottom than at the top, thus providing an annular step 57. The bottom of the ring may advantageously be provided with a substantially horizontal outer margin 58 and with an inner margin 59 that slopes upwardly as shown. The outer diameters of both the top and bottom portions of the ring 5a are somewhat smaller than the diameter of the recess 4a, and the inner diameter of the ring is somewhat smaller than the diameter of the restricted upper portion of the relief opening 4. In assembling the expansion ring 5a with the recess 4a, it is merely necessary to drop the expansion ring within the recess so that the horizontal outer margin 58 of the ring rests on the floor of the recess.

The throat tube nozzle 5 is provided with an outer annular vertical flange 60 and an inner vertical flange 61, the two flanges being connected by means of a curved annular recess 62. The outer diameter of the throat tube nozzle 5 is somewhat smaller than the recess 4a, but it is somewhat larger than the diameters of both portions of the expansion ring 5a. The inner diameter of the flange 60 is somewhat smaller than the diameter of the lower portion of the expansion ring, but it is somewhat larger than the diameter of the upper portion of the expansion ring. The inner diameter of the throat tube nozzle (i. e. the inner diameter of the inner flange 61) is somewhat larger than the inner diameter of the expansion ring. The inner flange 61 of the throat tube nozzle is substantially shorter than the outer flange 60, so that when the throat tube nozzle is placed in position (see Figure 7), the outer flange rests on the step 57 of the expansion ring and the flange 61 does not quite reach the upper surface of the expansion ring. The expansion ring is preferably of the same material as the body of the valve or of a material having substantially the same coefficient of expansion. As examples of suitable materials may be mentioned stainless steels such as a 4 to 6 chrome steel or a molybdenum steel. The throat tube nozzle may also be of the same material as the valve body, but it is preferably of a material having a slightly greater coefficient of expansion. The differential expansion should be within the elastic limit of both the throat tube nozzle and the expansion ring. The thicknesses of the thoat tube nozzle and the expansion ring are such that they can readily be expanded and rolled in the manner to be described.

To secure the throat tube nozzle to the body of the valve, the throat tube nozzle 5 and the expansion ring 5a are assembled in reference to the relief opening as shown in Figure 5, and are held by means of a suitable form of clamp to keep them in alinement and to prevent rotation. The throat tube nozzle and the expansion ring are then rolled into the recess 4a by means of a suitable form of expander in a manner similar to that employed in standard boiler tube practice. During this operation, the outer periphery of the throat tube nozzle and the outer periphery of the lower portion of the expansion ring are forced against the vertical wall of the recess 4a and the outer periphery of the upper portion of the expansion ring is forced against the inner periphery of the flange 60, so that the flange 60 is securely and permanently clamped between the upper portion of the expansion ring and the vertical wall of the recess 4a. The inner peripheries of both the throat tube nozzle and the expansion ring become flush with the upper end of the relief opening 4, the bottom 58, 59 of the expansion ring becomes flush with the floor of the recess 4a, and the inner flange 61 of the throat tube nozzle is flattened against the top of the expansion ring. The described rolling operation is preferably carried out before the other parts of the valve such as the guide, piston, valve disk, etc. are assembled. The construction and manner of assembly just described afford a very inexpensive and effective way to insure tightness between the throat tube and the valve body and to eliminate leakage between the seat ring and the body wall due to variable expansion and contraction. The above described construction also serves to greatly reduce the differential expansion between the valve body and throat tube, thereby avoiding undue stresses at the base of the valve and greatly reducing the compressive strain on the tube.

Before leaving the throat tube construction, it may be stated that the effectiveness of the clamping action of the expansion ring may be substantially increased by providing the vertical wall of the recess 4a and the outer periphery of the upper portion of the expansion ring with one or more horizontal annular grooves. In Figure 7, it will be noted that I have provided the vertical wall of the recess 4a with an annular groove 63 and the outer periphery of the upper portion of the expansion ring 5a with an annular groove 64. The annular groove 64 is somewhat lower in position than the groove 63, and it will be understood that during the expanding and rolling in operation a portion of the smooth outer surface of the flange 60 is forced into the groove 63 and a portion of the smooth inner surface of the flange 60 is forced into the groove 64.

Cooperating annular ribs and grooves may also be provided between the lower portion of the expansion ring 5a and the recess 4a and between the upper portion of the expansion ring and the flange 60 of the throat tube nozzle. In Figure 7, it will be noted that I have provided the lower portion of the expansion ring with a horizontal annular rib 65 and that I have provided the vertical wall of the recess 4a with a coperating annular groove 66. Also that I have provided the inner surface of the flange 60 and the upper portion of the expansion ring 5a with cooperating annular groove 67 and rib 68. Each cooperating annular groove and rib are preferably of the same the same vertical dimension (width), but the ribs are preferably of a greater horizontal dimension than the cooperating grooves. It will be understood that during the expanding and rolling in operation, the ribs 65 and 68 will be forced into the corresponding grooves 66 and 67 and that because of the relative dimensions of the ribs and grooves, the ribs will be caused to flatten out or become "bull-nosed," thereby forming a tight and permanent seal.

The valve may be installed in any position, but it should preferably be installed either vertically above the steam line or with the spring and frame rods hanging vertically below the line. If the valve is to be installed vertically downwards, it is preferable to provide a housing for the spring. As previously stated, the frame rods may also be encased in insulation material, provided that complete circulation around the frame rods is maintained.

It is through that the mode of operation of the valve will be understood from the foregoing description. Suffice it to say, that as the pressure of the steam in the throat tube reaches the popping pressure, the valve disk rises instantaneously to its full lift in a single stage. As has been previously stated, the least amount of steam at popping pressure leaking from the throat tube into the annular groove between the valve seat and the nozzle ring (space 7b in Figure 2) is sufficient to cause the valve to pop. As the valve disk recedes from its seat, steam is compressed into the exhaust belt from which it escapes through the exhaust ports to an extent depending upon the adjustment of the closure disks of the metering valves, thus removing the excess pressure from beneath the valve disk and eliminating all impediment to the closing of the valve when the necessary relief is obtained. As the valve disk returns to its seat the steam in the annular groove between the valve seat and the nozzle ring is compressed, forming a cushion so that the valve disk seats without shock or injury to the meeting surfaces. As previously noted, the metering valves may be readily adjusted to give a predetermined blow-down for a given set of conditions.

As has been stated, due to the difference in density between saturated and superheated steam, the adjustment of the metering valves cannot be the same for superheated steam as for saturated steam. In order to maintain the blow-down for superheated steam when the metering valves are adjusted for saturated steam, bimetallic strips and clips may be provided in association with the exhaust ports.

Figure 8:
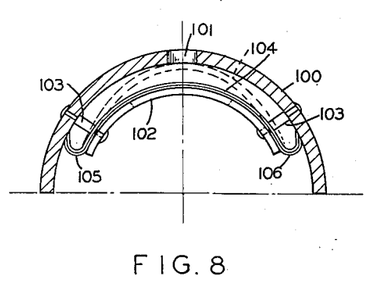
Figure 8 is a fragmentary horizontal cross-sectional view through the exhaust belt of a modified form of the valve illustrated in Figure 1, the modified form of valve being provided with bi-metallic strips for controlling the exhaust ports in the exhaust belt.
Figure 9:
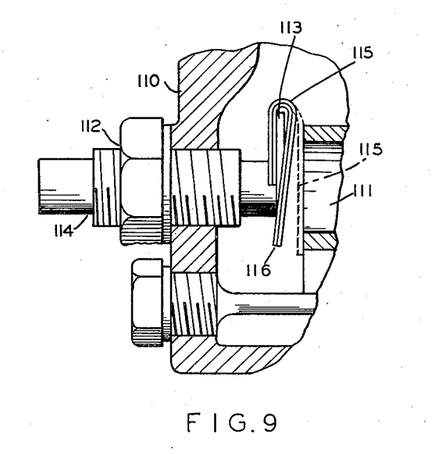
Figure 9 is an enlarged fragmentary vertical section through the exhaust belt and one of the metering valves through the same modified form of safety valve.

The bimetallic strip used in association with one of the exhaust ports is illustrated in Figure 8 and the bimetallic clip used in association with one of the metering valves is illustrated in Figure 9.

Referring to Figure 8, which is a fragmentary horizontal cross-section through the exhaust belt of a modified form of valve, the numeral 100 denotes the guide, within the lower end of which the exhaust belt is formed, and the numeral 101 denotes one of the exhaust ports in the exhaust belt. This is one of the exhaust ports that is not provided with a metering valve. The numeral 102 designates a support in the form of an arc which is permanently secured by rivets 103 to the wall of the exhaust belt. The numeral 104 denotes the bimetallic strip, which is also in the form of an arc having the two bent back end portions 105 and 106. The bimetallic strip is secured to the support 102 by the two rivets 103 in parallel spaced relation to the wall of the exhaust chamber with the two bent back end portions 105 and 106 in contact with the wall as shown. One or more apertures may be provided near the end portions of the support 102 to enable the steam to come into contact with the bimetallic strip and to pass freely through the exhaust port when the bimetallic strip is in the inactive position shown in solid lines.

The two metals of which the strip 104 is made are so chosen that the strip will expand and move outwardly against the exhaust port 101 as shown in dotted lines, when the temperature reaches a predetermined amount, and the strip will return to its normal position (shown in solid lines) when the temperature drops again to a predetermined lower limit. The upper and lower limits depend upon the conditions under which the valve is to be used. For instance, if the valve is to be used with steam at a pressure of 600 pounds per square inch, the upper limit should be about 200° higher than 486° F., which is the temperature of saturated steam at 600 pounds pressure. An upper limit of about 700° F. has been found to be particularly suitable. The lower limit may be between 486° and 700° F., a suitable lower limit being about 500° F. The range between 486° F. and 700° F. will adequately take care of steam at 600 pounds pressure having from about 200° to 400° superheat.

It will be understood from the foregoing description of the bimetallic strips that at 600 pounds pressure, the exhaust ports will remain open as long as the temperature of the steam in the exhaust belt is below 700° F. Hence, as long as saturated steam or steam having less than 214° superheat is in the exhaust belt, the exhaust ports will remain open, thereby permitting sufficient steam to escape to keep the blow-down at the value for which the valve was set or designed. If the ports were not provided with the bimetallic strips the ports would also remain open in case steam of a high superheat were to pass into the exhaust belt. Since superheated steam is less dense than saturated steam, the blow-down would tend to decrease below that for which the valve was set or designed. The closing of the ports by the bimetallic strips serves to retain the steam in the exhaust chamber and hence overcomes the tendency for the blow-down to decrease, thereby maintaining the blow-down at the predetermined value.

Referring to Figure 9, which is a fragmentary vertical cross-section through the exhaust belt of a modified form of valve, the numeral 110 denotes the body of the valve, the numeral 111 is one of the exhaust ports in the exhaust belt and the numeral 112 is the metering valve. The metering valve consists of a valve disk 113 carried on the inner end of a threaded rod 114, which extends through the wall of the valve body 110. Secured to the valve disk in a suitable manner is a bimetallic strip or clip 115, which is normally inclined so as to permit the escape of steam from the exhaust port 111. The bimetallic strip or clip has a free lower end 116, which under the influence of steam of a predetermined temperature is adapted to move inwardly against the exhaust port 111, thereby sealing it against the escape of steam. The bimetallic strip or clip 115 may be utilized in the same valve in which the bimetallic strip 104 is used, in which case the two elements of which the clip or strip 115 is formed would preferably have the same characteristics as the bimetallic strip 104. In an illustrative form of valve, the exhaust belt is provided with four equally spaced exhaust ports, two opposite exhaust ports being provided with metering valves. The exhaust ports that are not provided with metering valves are provided with the internally arranged bimetallic strips 104, and the valve disk of each metering valve is provided with a bimetallic strip or clip 115. If found necessary or desirable, the bimetallic strips may be omitted from all but one of the exhaust ports or metering valves.

Each of the various forms of valve that has been described is suitable for use either as a pilot valve or as a pilot-actuated valve in a fluid pressure system. If the valve is to be used as a pilot-actuated valve, it should not be provided with the bimetallic strips and clips above described.

Figure 10:
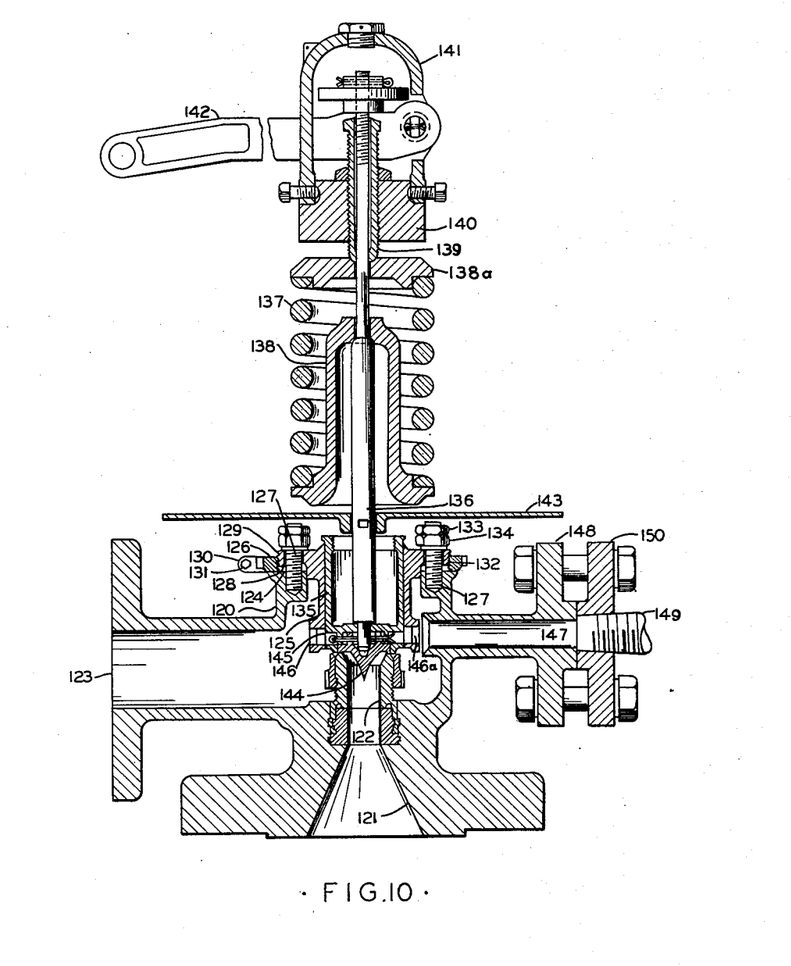
Figure 10 is a vertical section through an illustrative form of pilot valve constituting part of the fluid pressure system, the cross-section being taken at right angles to Figure 1.

Reference will now be had to Figure 10, wherein is shown an illustrative form of pilot valve that may be used as part of my fluid pressure system. The valve body is designated by 120, the relief opening by 121, the throat tube and associated parts by 122, and the flanged opening to the atmosphere by 123. The body of the valve is provided with a flat annular seat 124 upon which are mounted the cylindrical guide 125 and the adjusting ring 126 for the guide. The annular seat 124 is provided with a plurality of spaced threaded apertures for receiving the studs 127, which are threaded at their bottom portions as indicated.

The guide is provided with an annular flange 128 as shown, which is provided with a plurality of apertures equal in number to those in the annular seat 124. The outer periphery of the flange is threaded as indicated by the numeral 129 to receive the adjusting ring 126. The adjusting ring is in the form of a split annulus, provided on each side of the split with an ear 130, the two ears being provided with alined apertures for receiving a bolt 131. A suitable form of lock nut (not shown) may be provided for the bolt. The ring is provided on its inner periphery with screw threads 132.

From the foregoing description, it is thought to be clear that the cylindrical guide 125 may be readily adjusted so that the floor of the exhaust belt to be hereinafter referred to may be a predetermined or desired amount above the valve seat. This adjustment may be made by loosening the lock nut on the bolt 131, rotating the adjusting ring the necessary amount, and tightening the lock nut. Finally, the nuts 133 and 134 are tightened on the studs 127.

Referring further to Figure 10, the disk carrier or piston is denoted by 135, the spindle by 136, the spring by 137, the sleeve for the spring by 138, the spring washer by 138a, the pressure or adjusting screw by 139, the cross-rod for the frame rods (not shown) by 140, the bonnet by 141, the operating lever by 142, the deflector plate by 143 and the valve disk by 144. The numeral 145 denotes the exhaust chamber, and 146 and 146a designate two of the exhaust ports, which are not provided with metering valves. One of these ports (146a) is in alinement with a tube 147, which may be formed integrally with the body of the valve. The port 146a may be one of the two ports, which are normally provided with metering valves, in which case the tube 147 would be at right angles to port 146a instead of being opposite thereto as shown. In such case, only one instead of two of the ports would be provided with metering valves.

The tube 147 may advantageously be provided with a flange 148, so that the tube 147 may be readily connected with a second tube 149 leading to the operating lever of a pilot-actuated valve. For this purpose the second tube 149 may also be provided with a flange 150. Instead of the illustrated flanged connections, screwed connections may be used, if so desired, as the pressure developed in the actuating line is relatively small.

Any conventional form of safety valve may be modified in construction so as to be actuated by the jet of steam issuing from the exhaust port of the pilot valve of Figure 10. It is merely necessary to provide the valve to be actuated by the pilot valve with means actuated by the jet of steam to raise the operating lever and hence the valve disk independently of the valve disk.

Figure 11:
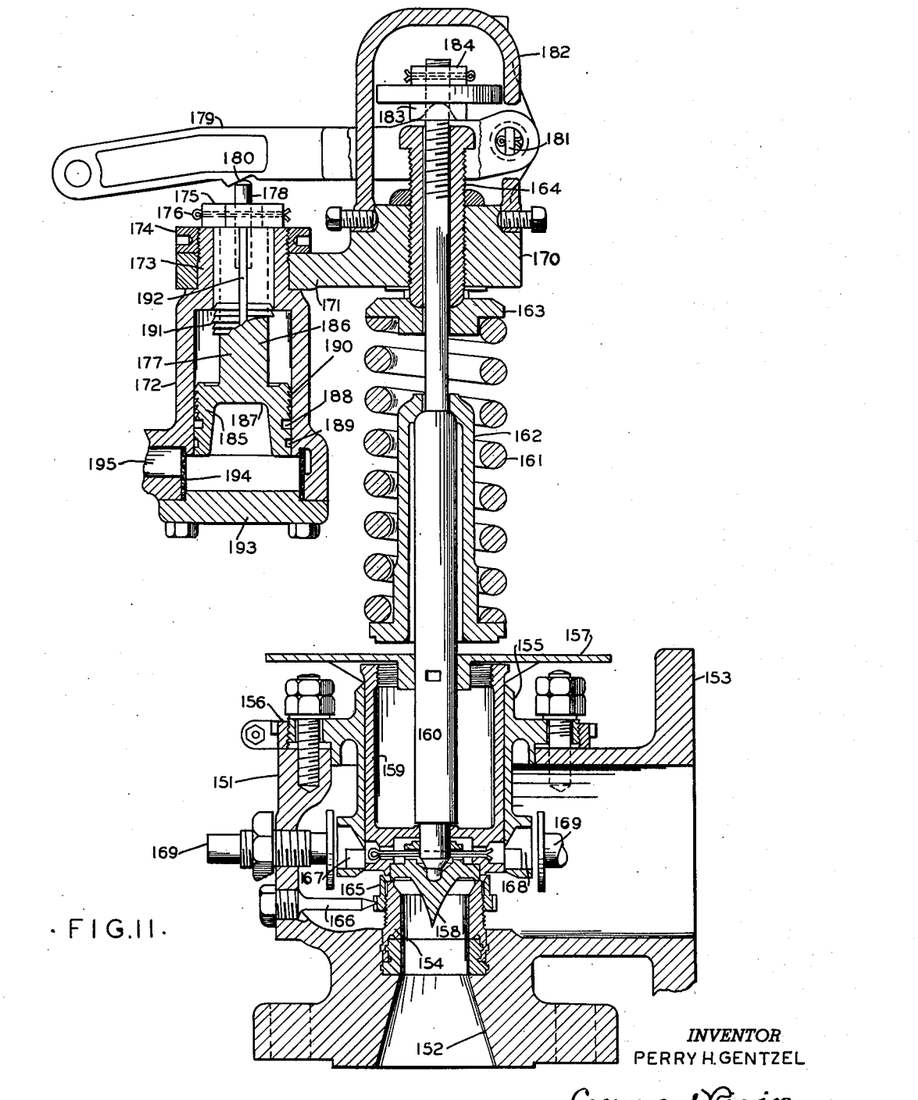
Figure 11 is a similar view of an illustrative form of pilot-actuated valve constituting part of the fluid pressure system.

In Figure 11 is illustrated a form of valve similar to the valve of Figure 10 modified in construction to adapt it for use as a pilot-actuated valve. The valve body is indicated by 151, the relief opening by 152, the flanged opening to the atmosphere by 153, the throat tube assembly by 154, the guide by 155, the adjusting ring for the guide by 156, the deflector plate by 157, the valve disk by 158, the piston by 159, the spindle by 160, the spring by 161, the sleeve for the spring by 162, the spring washer by 163, the pressure or adjusting screw by 164, the nozzle ring for the throat tube by 165, the locking screw for the nozzle ring by 166, the exhaust belt by 167, the exhaust ports by 168 and the metering valves by 169. All of the foregoing elements are substantially of the same construction as the corresponding elements shown in Figure 10.

In Figure 11, the numeral 170 denotes a modified form of cross-bar or yoke provided with an extension 171 for supporting the cylinder 172. The cylinder has a reduced upper portion 173 which fits snugly in an aperture provided in the extension, a part of 173 extending above the aperture and being provided with screw threads to receive a nut 174 to secure the cylinder in position. The numeral 175 denotes a lock nut of suitable construction provided with a key in the form of a cotter pin 176.

Mounted for vertical slidable movement within the cylinder 172 is a piston 177 provided with a vertical pin 178, which projects above the lock nut 175 and is normally in contact with the undersurface of the operating lever 179. The lever may be provided with a cam surface 180 as shown to coact with the pin 178. The lever is fulcrumed at 181 in the bonnet 182 of the valve and contacts the lower surface of a nut 183, which is threadedly connected to the upper reduced end of the spindle 160. The nut 183 may be locked in position by means of a suitable form of lock nut 184.

The piston 177 may advantageously be of the construction illustrated in Figure 11. As there shown, the piston has a wide lower portion 185 fitting snugly in the central portion of the cylinder, and a narrow upper portion 186 fitting snugly in the reduced upper portion of the cylinder. The lower portion of the piston may be hollowed out as at 187 to reduce the weight of the piston and may also be provided about its outer periphery with a number of annular grooves 188 and 189 and with a number of serrations 190. The narrow upper portion of the piston may be provided with a series of peripheral serrations 191 and with a number of vertical slots 192. The purpose of the annular grooves and serrations in the piston is to form a labyrinth packing as in the case of the guide and piston of the valves. The slots 192 permit air and steam to escape from the cylinder when the piston rises to prevent the pressure within the cylinder from building up.

The bottom of the cylinder 172 is closed by means of a plate 193. Between the piston 177 and the bottom plate 193 is provided a vertical cylindrical screen 194 for a purpose which will appear as the description proceeds. As shown, the bottom of the cylinder is provided at one side with an opening 195 for connection to the actuating line 149 from the pilot valve. Steam entering the cylinder 172 through the aperture 195 must pass through the screen, and hence any dirt that may be in the steam is kept out of the cylinder.

It is to be noted that the above described construction renders it possible to rotate the cross-bar or yoke 170 with the frame rods (not shown) as much as 180° to meet piping requirements.

It will be understood from the foregoing description that when the pilot valve pops, there will issue from the exhaust port 146a a jet of high velocity steam which will flow through the tubes 147 and 149 to the cylinder 172 of the pilot-actuated valve, and that this jet of steam will raise the piston 177 and the pin 178 against the cam surface 180 on the undersurface of the lever 179, thereby raising the valve disk 158 independently of the pressure under the valve disk. When the pilot valve closes, the flow of steam from the exhaust chamber ceases. The piston 177 then drops and the valve disk 158 is caused to return to its seat. It is to be noted that the valve disk 158 cannot seat itself before the pilot valve closes, due to the fact that the steam in the actuating line tends to expand. It is also to be noted that in case the pilot valve for some reason fails to function, the pilot-actuated valve will nevertheless operate to relieve excess pressure that may be built up under the valve disk 158.

Figure 12:
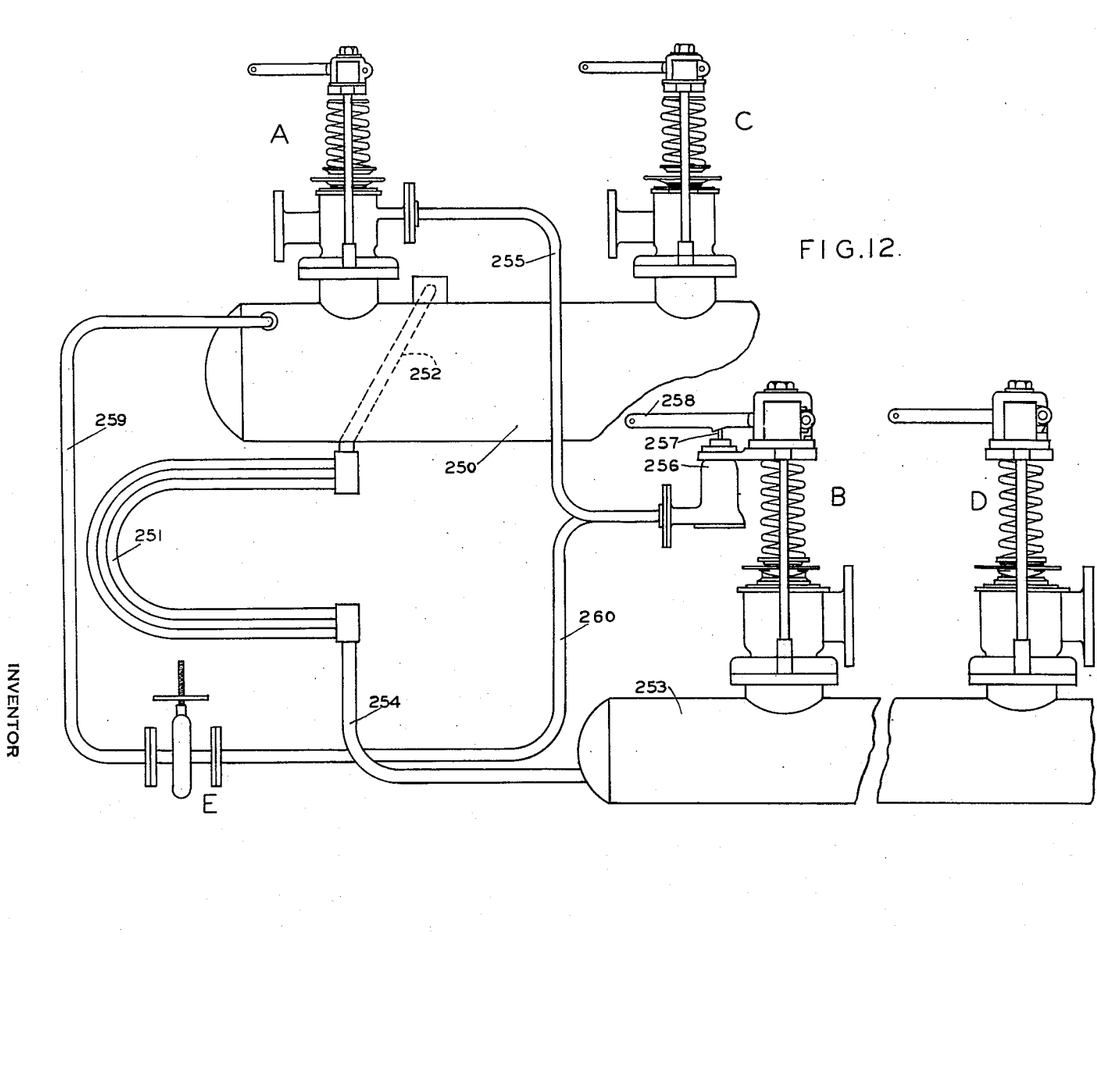
Figure 12 is a diagrammatic or schematic representation of the preferred embodiment of my fluid pressure system.

Reference will now be had to Figure 12, wherein I have illustrated a preferred embodiment of the above referred to fluid pressure system. In said figure, 250 indicates the drum of a steam generating boiler, 251 denotes the coils of a superheater, 252 is a suitable connection between the drum 250 and the superheater coils, 253 is the superheater outlet line, and 254 is a suitable connection between the superheater 251 and the superheater outlet line 253.

The letter A designates a pilot valve on the drum, B is a pilot-actuated valve on the superheater outlet line, C is a second drum valve which, however, is not a pilot valve, and D is a second superheater outlet valve, which may but need not be a pilot-actuated valve.

The valve A may be of the construction shown in Figure 10, and valve B may be of the construction shown in Figure 11. Valves C and D may be of the construction shown in Figures 1 to 5 inclusive. Valve D may be provided with the bimetallic strips or clips illustrated in Figures 8 and 9.

The numeral 255 designates the actuating line from the exhaust belt of the pilot valve A to the cylinder 256 of the pilot-actuated valve B. This cylinder contains a piston (not shown) provided with a pin 257 which is in contact with the underside of the operating lever 258.

The letter E denotes a gate valve connected to the drum 250 by means of a line 259 and to the actuating line 255 of the pilot-actuated valve B by means of the line 260.

In the illustrative embodiment of the system shown in Figure 12, the pilot valve A may have a capacity of 8,000 pounds of steam per hour, a popping pressure of 610 pounds and a blow-down of 18 pounds; the pilot-actuated valve B may have a capacity of 45,000 pounds of steam per hour, a popping pressure of about 610 pounds and a blow-down of 18 pounds; valve C may have a capacity of 55,000 pounds of steam per hour, a popping pressure of 616 pounds and a blow-down of 18 pounds; and valve D may have a capacity of 38,000 pounds of steam per hour, a popping pressure of 618 pounds and a blow-down of 18 pounds.

It is thought that the operation of the system will be readily understood from the foregoing description. Suffice it to say, that if the system is operating normally and a heavy draft of steam is being taken from the outlet line, the pressure in the system will remain below the popping pressure and all of the valves will remain shut. Should, however, the call for steam cease, there will be a rapid build-up of pressure in both the superheater and in the saturated drum. Due to the normal drop in pressure between the drum and the superheater, the pilot valve A will normally pop first (i. e. as soon as the pressure under the valve disk in pilot valve A reaches 610 pounds). A small jet of steam from the exhaust belt of valve A will then be carried by the actuating line 255 to the cylinder 256 of pilot-actuated valve B, and the lever 258 thereof will be raised by the piston and valve B will also pop. If the popping of valves A and B does not relieve the pressure in the line sufficiently, then valve C will pop, and if the pressure is still not reduced sufficiently, valve D will also go. As soon as the pressure below the valve disk of the pilot valve drops by an amount equal to the blow-down, valve A will return to its seat, and valve B will follow. It is to be noted that valve B cannot seat before valve A due to the expansion of steam in the actuating line. In the illustrative system the lag between the closing of valves A and B is about 2/5 of a second. Valves C and D will close about the same time as valve B.

In case valve A for any reason fails to pop, valve B will nevertheless pop as soon as the popping pressure is reached below its valve disk. In case of an emergency, the chief engineer can readily open the gate valve E, thereby causing valve B to pop irrespective of the line pressure, and preventing the burning out of the superheater coils.

Figures 13, 14:
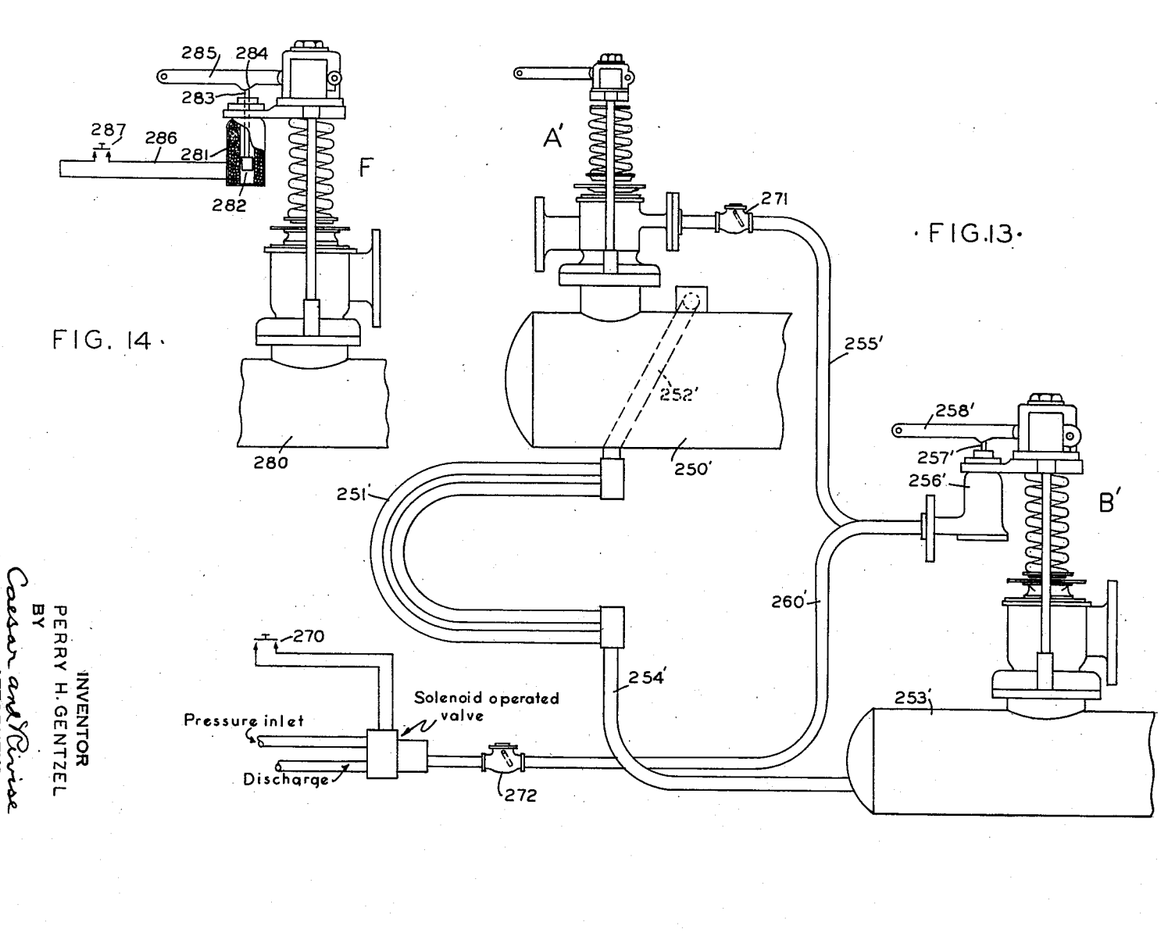
Figure 13 is a diagrammatic or schematic representation of another embodiment of the fluid pressure system.
Figure 14 is a diagrammatic representation of a solenoid-operated valve that may be used in the fluid pressure system.

The embodiment of the invention shown in Figure 13 differs from the system shown in Figure 12 in that a solenoid-operated valve is used to cause the pilot-actuated valve on the superheater outlet line to pop in case of an emergency.

Referring to Figure 13, the drum of the steam generating boiler is denoted by 250', the coils of the superheater by 251', the connection between the drum and superheater coils by 252', the superheater outlet line by 253', and the connection between the superheater and the superheater outlet line by 254'. The pilot valve on the drum is designated by A', and the pilot-actuated valve on the superheater outlet line by B'. The other valves are omitted for greater clearness of illustration.

The numeral 255' designates the actuating line from the exhaust belt of the pilot valve A' to the cylinder 256' of the pilot-actuated valve B'. The cylinder contains a piston (not shown) provided with a pin 257' which contacts the underside of the operating lever 258'. The numeral 260' denotes a line from a source of pressure such as steam, air, water, oil or other fluid, said line 260' being connected to the actuating line 255' of the pilot-actuated valve B'. As shown, the line 269' contains a solenoid-operated valve, which may be either a two or three way valve. The numeral 270 designates a push button, switch or similar device for actuating the solenoid valve. A check valve 271 is preferably placed in the line 255', opening away from the valve A', and a similar valve 272 is preferably placed in the line 260', opening away from the solenoid-operated valve, for a purpose which will appear as the description proceeds.

The operation of the system in Figure 13 is substantially as follows:

If the pressure in the boiler 250' rises too high, the pilot valve A' will pop. Steam from the exhaust belt of valve A' will rush into the line 255' and into the cylinder 256' of the pilot-actuated valve B', thereby raising the lever 258' and causing the valve B' to pop. The check valve 271 will permit the jet of steam to pass into the line 255', but the check valve 272 will prevent the jet of steam from reaching the solenoid-operated valve.

If an emergency occurs, the valve B' may be caused to pop by means of the solenoid-operated valve. In such case, the check valve 272 permits the pressure medium, whether it be air, steam, water or oil, to enter the actuating line 255', while the check valve 271 does not permit the pressure medium to reach the pilot valve A'.

If it should happen that the solenoid-operated valve is actuated at the same time that valve A' pops, the valve B' will be actuated by either the jet of steam from the valve A' or the pressure medium from the solenoid-operated valve, depending upon which medium is under the greater pressure.

In Figure 14, is shown a valve which may be caused to pop by the direct actuation of a solenoid. The valve is denoted by F and is illustrated as being mounted on either a drum or superheater outlet line 280. The valve is of substantially the same construction as the pilot-actuated valves previously described, with the exception that the cylinder 281 houses a suitable form of solenoid 282. The numeral 283 denotes a pin which is integral with the core of the solenoid, said pin being in contact with a cam 284 on the bottom of the operating lever 285. The reference character 286 designates suitable connections to a push button or actuating switch 287. It will be understood that the push button or actuating switch 287 may be positioned at any convenient location, so that the valve F may be caused to pop whenever deemed necessary without any undue delay. This also applies to the push button or actuating switch 270 in the system of Figure 13.

Any of the valves in the system of Figures 12 and 13 with the exception of the pilot-actuated valve may be provided with the solenoid-operating means shown in Figure 14. A valve thus equipped may be directly caused to pop irrespective of the pressure under the valve disk. In case the pilot valve is thus equipped, direct actuation of the pivot valve will cause the pilot-actuated valve to pop in the manner previously described.

In conclusion, it may be stated that various other modifications of the invention may be made, and that it is therefore to be understood that the invention is not to be considered as being limited by the specific examples herein given as illustrative of the invention, except as may be necessitated by the state of the prior art.

This application is a continuation of application Serial No. 417,775, filed November 4, 1941, now abandoned, which application is in turn a continuation in part of application Serial No. 287,608, filed July 31, 1939, now Patent No. 2,278,437, dated April 7, 1942.

I claim:

In a fluid pressure system, the combination of a pilot valve and a pilot-actuated valve, the pilot valve comprising a valve body provided with a relief opening adapted to be connected with a tank containing fluid under pressure, said opening being provided about its periphery with an annular valve seat, a piston slidably mounted within said valve body in alinement with said relief opening, and a valve disk carried by said piston in position normally to be seated against said valve seat, the body of said valve adjacent said relief opening being provided with an annular recess forming an exhaust chamber, said piston being adapted to uncover said exhaust chamber, the pilot-actuated valve comprising a valve body provided with a relief port adapted to be connected with a tank containing fluid under pressure, said port being provided about its periphery with an annular valve seat, a loaded spindle mounted in said valve body, a valve disk carried by said spindle in position to be seated against said valve seat, a lever connected to said spindle above said valve disk to lift said spindle, a cylinder, a piston slidably mounted in said cylinder and having a portion cooperating with said lever, and a connection from the exhaust chamber of the pilot valve to convey a jet of fluid to one side of said piston to actuate said lever and to lift the valve disk of the pilot-actuated valve irrespective of the pressure below the valve disk of said pilot-actuated valve.

PERRY H. GENTZEL.

References Cited in the file of this patent

UNITED STATES PATENTS

| Number | Name | Date |
| --- | --- | --- |
| 1,924,563 | Lucke | Aug. 29, 1933 |
| 1,951,049 | Graesser | Mar. 13, 1934 |
| 2,047,403 | Beck | July 14, 1936 |
| 2,059,722 | Beck et al. | Nov. 4, 1936 |
| 2,180,395 | Briscoe | Nov. 21, 1939 |
| 2,278,437 | Gentzel | Apr. 7, 1942 |
| 2,287,433 | Klafstad | June 22, 1942 |